(12) United States Patent
Ludwig

(10) Patent No.: US 9,304,677 B2
(45) Date of Patent: *Apr. 5, 2016

(54) TOUCH SCREEN APPARATUS FOR RECOGNIZING A TOUCH GESTURE

(75) Inventor: Lester F. Ludwig, San Antonio, TX (US)

(73) Assignee: Advanced Touchscreen and Gestures Technologies, LLC, San Antonio, TX (US)

( * ) Notice: Subject to any disclaimer, the term of this patent is extended or adjusted under 35 U.S.C. 154(b) by 747 days.

This patent is subject to a terminal disclaimer.

(21) Appl. No.: 13/473,525

(22) Filed: May 16, 2012

(65) Prior Publication Data

US 2012/0235940 A1 Sep. 20, 2012

Related U.S. Application Data

(60) Continuation of application No. 11/761,978, filed on Jun. 12, 2007, now Pat. No. 8,717,303, which is a continuation of application No. 09/812,400, filed on Mar. 19, 2001, now Pat. No. 7,786,370, which is a (Continued)

(51) Int. Cl.
*G06F 3/01* (2006.01)
*G06F 3/0488* (2013.01)
(Continued)

(52) U.S. Cl.
CPC ............ *G06F 3/04883* (2013.01); *G06F 3/005* (2013.01); *G06F 3/017* (2013.01);
(Continued)

(58) Field of Classification Search
CPC . G06F 3/04883; G06F 3/04886; G06F 3/041; G06F 3/0412; G06F 3/0414; G06F 3/0416; G06F 3/044; G06F 3/048

USPC ..................... 345/173–178; 178/18.01–18.08
See application file for complete search history.

(56) References Cited

U.S. PATENT DOCUMENTS 1,947,020 A 2/1934 Howland
3,493,669 A 2/1970 Elbrecht et al.
(Continued)

FOREIGN PATENT DOCUMENTS

EP 0609021 8/1994
EP 0689122 12/1995
(Continued)

OTHER PUBLICATIONS

USPTO Non-Final Office Action dated Jan. 23, 2012 issued in U.S. Appl. No. 12/418,605, filed Apr. 5, 2009.
(Continued)

*Primary Examiner* — Premal Patel
(74) *Attorney, Agent, or Firm* — Beck Tysver Evans PLLC

(57) ABSTRACT

A touch-based user interface system comprising an arrangement for scanning a tactile sensor array to produce a corresponding array of measurement values that are presented to a processor for computation. The computation produces a plurality of running sums created from selected measurement values or functions of selected measurement values. A post-scan computation algorithm derives at least three independently-adjustable interactive control parameters responsive to at least displacements or angles the contact of a single area of threshold contact or threshold proximity. The system provides output control signals responsive to the independently-adjustable interactive control parameters. In one aspect of the invention, n algorithmic element for handling of regions of threshold contact or threshold proximity having non-convex shapes. In another aspect of the invention, an algorithmic element calculates the rate of change of one or more of the independently-adjustable interactive control parameters. Other aspects of the invention include shape and gesture recognition.

25 Claims, 6 Drawing Sheets

Related U.S. Application Data division of application No. 09/313,533, filed on May 15, 1999, now Pat. No. 6,610,917.

(60) Provisional application No. 60/085,713, filed on May 15, 1998.

(51) Int. Cl.

| | |
|---|---|
| *G10H 1/00* | (2006.01) |
| *G10H 1/34* | (2006.01) |
| *G10H 1/46* | (2006.01) |
| *G10H 3/18* | (2006.01) |
| *G10H 3/26* | (2006.01) |
| *G06F 3/00* | (2006.01) |
| *G06F 3/041* | (2006.01) |

(52) U.S. Cl.
CPC ............. *G06F 3/041* (2013.01); *G06F 3/0412* (2013.01); *G06F 3/0416* (2013.01); *G06F 3/0488* (2013.01); *G10H 1/00* (2013.01); *G10H 1/0058* (2013.01); *G10H 1/0066* (2013.01); *G10H 1/348* (2013.01); *G10H 1/46* (2013.01); *G10H 3/18* (2013.01); *G10H 3/26* (2013.01); *G10H 2220/521* (2013.01); *G10H 2220/525* (2013.01); *G10H 2230/095* (2013.01); *G10H 2230/101* (2013.01); *G10H 2230/115* (2013.01); *G10H 2230/145* (2013.01); *G10H 2230/271* (2013.01); *Y10S 84/10* (2013.01)

(56) References Cited

U.S. PATENT DOCUMENTS

| | | |
|---|---|---|
| 3,591,699 A | 7/1971 | Cutler |
| 3,612,741 A | 10/1971 | Marshall |
| 3,651,242 A | 3/1972 | Evans |
| 3,730,046 A | 5/1973 | Spence |
| 3,742,113 A | 6/1973 | Cohen |
| 3,742,133 A | 6/1973 | O'Sullivan |
| 3,805,091 A | 4/1974 | Colin |
| 3,813,473 A | 5/1974 | Terymenko |
| 3,878,748 A | 4/1975 | Spence |
| 3,910,152 A | 10/1975 | Kusakawa |
| 3,956,959 A | 5/1976 | Ebihara et al. |
| 3,962,945 A | 6/1976 | Creager et al. |
| 4,075,921 A | 2/1978 | Heet |
| 4,080,867 A | 3/1978 | Ratanangsu |
| 4,117,413 A | 9/1978 | Moog |
| 4,122,742 A | 10/1978 | Deutsch |
| 4,151,368 A | 4/1979 | Fricke et al. |
| 4,182,213 A | 1/1980 | Iodice |
| 4,274,321 A | 6/1981 | Swartz |
| 4,318,327 A | 3/1982 | Toups |
| 4,365,533 A | 12/1982 | Clark, Jr. et al. |
| 4,563,933 A | 1/1986 | Kim |
| 4,570,149 A | 2/1986 | Thornburg et al. |
| 4,658,690 A | 4/1987 | Aitken et al. |
| 4,686,332 A | 8/1987 | Greanias et al. |
| 4,702,141 A | 10/1987 | Bonanno |
| 4,748,676 A | 5/1988 | Miyagawa et al. |
| 4,781,099 A | 11/1988 | Koike |
| 4,794,838 A | 1/1989 | Corrigau, III |
| 4,797,608 A | 1/1989 | White |
| 4,852,444 A | 8/1989 | Hoover et al. |
| 4,899,137 A | 2/1990 | Behrens et al. |
| 4,915,005 A | 4/1990 | Shaffer et al. |
| 4,974,599 A | 12/1990 | Suzuki |
| 4,988,981 A | 1/1991 | Zimmerman et al. |
| 4,991,488 A | 2/1991 | Fala et al. |
| 5,033,352 A | 7/1991 | Kellogg et al. |
| 5,045,687 A | 9/1991 | Gurner |
| 5,070,399 A | 12/1991 | Martel |
| 5,095,799 A | 3/1992 | Wallace et al. |
| 5,146,833 A | 9/1992 | Lui |
| 5,159,140 A | 10/1992 | Kimpara et al. |
| 5,168,531 A | 12/1992 | Sigel |
| 5,194,862 A | 3/1993 | Edwards |
| 5,203,704 A | 4/1993 | McCloud |
| 5,214,615 A | 5/1993 | Bauer |
| 5,218,160 A | 6/1993 | Grob-Da Veiga |
| 5,233,123 A | 8/1993 | Rose et al. |
| 5,237,647 A | 8/1993 | Roberts et al. |
| 5,262,585 A | 11/1993 | Greene et al. |
| 5,270,711 A | 12/1993 | Knapp |
| 5,281,754 A | 1/1994 | Farrett et al. |
| 5,292,999 A | 3/1994 | Tumura |
| 5,341,133 A | 8/1994 | Savoy et al. |
| 5,342,054 A | 8/1994 | Chang et al. |
| 5,347,295 A | 9/1994 | Aguinick et al. |
| 5,347,477 A | 9/1994 | Lee |
| 5,357,048 A | 10/1994 | Sgroi |
| 5,378,850 A | 1/1995 | Tumura |
| 5,386,219 A | 1/1995 | Greanias et al. |
| 5,389,730 A | 2/1995 | Wachi |
| 5,394,784 A | 3/1995 | Pierce et al. |
| 5,404,458 A | 4/1995 | Zetts |
| 5,408,914 A | 4/1995 | Breitweiser, Jr. et al. |
| 5,420,936 A | 5/1995 | Fitzpatrick et al. |
| 5,440,072 A | 8/1995 | Willis |
| 5,442,168 A | 8/1995 | Gurner et al. |
| 5,454,043 A | 9/1995 | Freeman |
| 5,459,282 A | 10/1995 | Willis |
| 5,471,008 A | 11/1995 | Fujita et al. |
| 5,475,214 A | 12/1995 | DeFranco et al. |
| 5,483,261 A | 1/1996 | Yasutake |
| 5,512,490 A | 4/1996 | Walt et al. |
| 5,531,227 A | 7/1996 | Schneider |
| 5,540,133 A | 7/1996 | Draper et al. |
| 5,543,591 A | 8/1996 | Gillespie et al. |
| 5,565,641 A | 10/1996 | Gruenbaum |
| 5,585,588 A | 12/1996 | Tumura |
| 5,592,572 A | 1/1997 | Le |
| 5,592,752 A | 1/1997 | Fu et al. |
| 5,594,469 A | 1/1997 | Freeman et al. |
| 5,596,697 A | 1/1997 | Foster et al. |
| 5,598,208 A | 1/1997 | McClintock |
| 5,604,323 A | 2/1997 | Hardie-bick |
| 5,617,855 A | 4/1997 | Waletzky et al. |
| 5,621,438 A | 4/1997 | Kamimura et al. |
| 5,625,704 A | 4/1997 | Prasad |
| 5,659,145 A | 8/1997 | Weil |
| 5,659,466 A | 8/1997 | Norris et al. |
| 5,659,625 A | 8/1997 | Marquardt |
| 5,662,111 A | 9/1997 | Cosman |
| 5,665,927 A | 9/1997 | Taki et al. |
| 5,668,338 A | 9/1997 | Hewitt et al. |
| 5,675,100 A | 10/1997 | Hewlett |
| 5,703,303 A | 12/1997 | Stewart |
| 5,717,939 A | 2/1998 | Bricklin et al. |
| 5,719,347 A | 2/1998 | Masubuchi et al. |
| 5,719,561 A | 2/1998 | Gonzales |
| 5,724,985 A | 3/1998 | Snell et al. |
| 5,741,993 A | 4/1998 | Kushimiya |
| 5,744,742 A | 4/1998 | Lindemann et al. |
| 5,748,184 A | 5/1998 | Shieh |
| 5,763,806 A | 6/1998 | Willis |
| 5,777,605 A | 7/1998 | Yoshinobu et al. |
| 5,786,540 A | 7/1998 | Westlund |
| 5,796,025 A | 8/1998 | Haake |
| 5,801,340 A | 9/1998 | Peter |
| 5,805,137 A | 9/1998 | Yasutake |
| 5,808,605 A | 9/1998 | Shieh |
| 5,824,930 A | 10/1998 | Ura et al. |
| 5,825,352 A | 10/1998 | Bisset et al. |
| 5,827,989 A | 10/1998 | Fay et al. |
| 5,841,428 A | 11/1998 | Jaeger et al. |
| 5,844,547 A | 12/1998 | Minakuchi et al. |
| 5,850,051 A | 12/1998 | Machover et al. |
| 5,852,251 A | 12/1998 | Su et al. |
| 5,870,083 A | 2/1999 | Shieh |
| 5,889,236 A | 3/1999 | Gillespie et al. |
| 5,907,115 A | 5/1999 | Matsunaga et al. |
| 5,932,827 A | 8/1999 | Osbourne et al. |

(56) References Cited

U.S. PATENT DOCUMENTS

| | | | |
|---|---|---|---|
| 5,943,052 A | 8/1999 | Allen et al. |
| 5,969,283 A | 10/1999 | Looney et al. |
| 5,977,466 A | 11/1999 | Muramatsu |
| 5,981,859 A | 11/1999 | Suzuki |
| 5,981,860 A | 11/1999 | Isozaki et al. |
| 5,982,302 A | 11/1999 | Ure |
| 5,986,201 A | 11/1999 | Starr et al. |
| 5,986,224 A | 11/1999 | Kent |
| 6,002,808 A | 12/1999 | Freeman |
| 6,005,545 A | 12/1999 | Nishida et al. |
| 6,018,118 A | 1/2000 | Smith et al. |
| 6,037,937 A | 3/2000 | Beaton et al. |
| 6,047,073 A | 4/2000 | Norris et al. |
| 6,049,327 A | 4/2000 | Walker et al. |
| 6,051,769 A | 4/2000 | Brown |
| 6,066,794 A | 5/2000 | Longo |
| 6,069,326 A | 5/2000 | Henson et al. |
| 6,071,193 A | 6/2000 | Suzuoki |
| 6,087,570 A | 7/2000 | Sherlock |
| 6,091,012 A | 7/2000 | Takahashi |
| 6,100,461 A | 8/2000 | Hewitt |
| 6,104,317 A | 8/2000 | Panagrossi |
| 6,107,997 A | 8/2000 | Ure |
| 6,128,003 A | 10/2000 | Smith et al. |
| 6,137,479 A | 10/2000 | Olsen et al. |
| 6,140,565 A | 10/2000 | Yamauchi et al. |
| 6,188,776 B1 | 2/2001 | Covell et al. |
| 6,195,104 B1 | 2/2001 | Lyons |
| 6,204,441 B1 | 3/2001 | Asahi et al. |
| 6,225,975 B1 | 5/2001 | Furuki et al. |
| 6,256,046 B1 | 7/2001 | Waters et al. |
| 6,278,443 B1 | 8/2001 | Amro et al. |
| 6,285,358 B1 | 9/2001 | Roberts |
| 6,288,317 B1 | 9/2001 | Willis |
| 6,292,690 B1 | 9/2001 | Petrucelli et al. |
| 6,310,219 B1 | 10/2001 | Sawaki et al. |
| 6,310,279 B1 | 10/2001 | Suzuki et al. |
| 6,310,610 B1 | 10/2001 | Beaton et al. |
| 6,320,112 B1 | 11/2001 | Lotze |
| 6,323,846 B1 | 11/2001 | Westerman et al. |
| 6,335,861 B1 | 1/2002 | Ramsey, III et al. |
| 6,360,019 B1 | 3/2002 | Chaddha |
| 6,362,411 B1 | 3/2002 | Suzuki et al. |
| 6,363,159 B1 | 3/2002 | Rhoads |
| 6,373,475 B1 | 4/2002 | Challis |
| 6,392,636 B1 | 5/2002 | Ferrari et al. |
| 6,392,705 B1 | 5/2002 | Chaddha |
| 6,400,836 B2 | 6/2002 | Senior |
| 6,404,898 B1 | 6/2002 | Rhoads |
| 6,408,087 B1 | 6/2002 | Kramer |
| 6,433,801 B1 | 8/2002 | Moon et al. |
| 6,509,847 B1 | 1/2003 | Anderson |
| 6,570,078 B2 | 5/2003 | Ludwig |
| 6,610,917 B2 | 8/2003 | Ludwig |
| 6,703,552 B2 | 3/2004 | Haken |
| 6,753,466 B1 | 6/2004 | Lee |
| 6,793,619 B1 | 9/2004 | Blumental |
| 6,798,427 B1 | 9/2004 | Suzuki et al. |
| 6,835,887 B2 | 12/2004 | Devecka |
| 6,888,057 B2 | 5/2005 | Juszkiewicz et al. |
| 6,920,619 B1 | 7/2005 | Milekic |
| 7,030,860 B1 | 4/2006 | Hsu et al. |
| 7,176,373 B1 | 2/2007 | Longo |
| 7,309,829 B1 | 12/2007 | Ludwig |
| 7,408,108 B2 | 8/2008 | Ludwig |
| 7,557,797 B2 | 7/2009 | Ludwig |
| 7,598,949 B2 | 10/2009 | Han |
| 7,611,409 B2 | 11/2009 | Muir et al. |
| 7,812,828 B2 | 10/2010 | Westerman et al. |
| 7,936,341 B2 | 5/2011 | Weiss |
| 8,049,730 B2 | 11/2011 | Joquet et al. |
| 8,154,529 B2 | 4/2012 | Sleeman et al. |
| 8,169,414 B2 | 5/2012 | Lim |
| 8,170,346 B2 | 5/2012 | Ludwig |
| 8,179,376 B2 | 5/2012 | Griffin |
| 8,345,014 B2 | 1/2013 | Lim |
| 2001/0012000 A1 | 8/2001 | Eberhard |
| 2001/0036299 A1 | 11/2001 | Senior |
| 2002/0005108 A1 | 1/2002 | Ludwig |
| 2002/0005111 A1 | 1/2002 | Ludwig |
| 2002/0088337 A1 | 7/2002 | Devecka |
| 2002/0093491 A1 | 7/2002 | Gillespie et al. |
| 2003/0003976 A1 | 1/2003 | Mura |
| 2003/0151592 A1 | 8/2003 | Ritter |
| 2003/0188627 A1 | 10/2003 | Longo |
| 2004/0074379 A1 | 4/2004 | Ludwig |
| 2004/0118268 A1 | 6/2004 | Ludwig |
| 2004/0245438 A1 | 12/2004 | Payne |
| 2004/0251402 A1 | 12/2004 | Reime |
| 2005/0078085 A1 | 4/2005 | Casebolt et al. |
| 2005/0120870 A1 | 6/2005 | Ludwig |
| 2005/0179651 A1 | 8/2005 | Ludwig |
| 2006/0086896 A1 | 4/2006 | Han |
| 2006/0250353 A1 | 11/2006 | Yasutake |
| 2006/0252530 A1 | 11/2006 | Oberberger et al. |
| 2006/0267957 A1 | 11/2006 | Kolmykov-Zotov et al. |
| 2006/0278068 A1 | 12/2006 | Nielsen et al. |
| 2007/0044019 A1 | 2/2007 | Moon |
| 2007/0063990 A1 | 3/2007 | Park et al. |
| 2007/0216641 A1 | 9/2007 | Young et al. |
| 2007/0229477 A1 | 10/2007 | Ludwig |
| 2007/0236477 A1 | 10/2007 | Ryu et al. |
| 2007/0291009 A1 | 12/2007 | Wright et al. |
| 2008/0001925 A1 | 1/2008 | XiaoPing |
| 2008/0010616 A1 | 1/2008 | Algreatly |
| 2008/0012832 A1 | 1/2008 | GuangHai |
| 2008/0034286 A1 | 2/2008 | Selby |
| 2008/0036743 A1* | 2/2008 | Westerman et al. .......... 345/173 |
| 2008/0055263 A1 | 3/2008 | Lemay et al. |
| 2008/0091453 A1 | 4/2008 | Meehan et al. |
| 2008/0122796 A1 | 5/2008 | Jobs et al. |
| 2008/0143690 A1 | 6/2008 | Jang et al. |
| 2008/0158146 A1* | 7/2008 | Westerman ................. 345/156 |
| 2008/0158172 A1 | 7/2008 | Hotelling et al. |
| 2008/0158185 A1* | 7/2008 | Westerman ................. 345/173 |
| 2008/0164076 A1 | 7/2008 | Orsley |
| 2008/0168403 A1 | 7/2008 | Westerman et al. |
| 2008/0259053 A1 | 10/2008 | Newton |
| 2008/0297482 A1 | 12/2008 | Weiss |
| 2008/0300055 A1 | 12/2008 | Lutnick et al. |
| 2008/0309634 A1 | 12/2008 | Hotelling et al. |
| 2009/0002333 A1 | 1/2009 | Maxwell et al. |
| 2009/0006292 A1 | 1/2009 | Block |
| 2009/0019996 A1 | 1/2009 | Fujishima et al. |
| 2009/0027351 A1 | 1/2009 | Zhang et al. |
| 2009/0051659 A1 | 2/2009 | Mickelborough |
| 2009/0124348 A1 | 5/2009 | Yoseloff et al. |
| 2009/0146968 A1 | 6/2009 | Narita et al. |
| 2009/0167701 A1 | 7/2009 | Ronkainen |
| 2009/0254869 A1* | 10/2009 | Ludwig et al. ................ 715/863 |
| 2010/0013860 A1 | 1/2010 | Mandella et al. |
| 2010/0044121 A1 | 2/2010 | Simon et al. |
| 2010/0060607 A1 | 3/2010 | Ludwig |
| 2010/0073318 A1 | 3/2010 | Hu et al. |
| 2010/0079385 A1 | 4/2010 | Holmgren et al. |
| 2010/0079405 A1 | 4/2010 | Bernstein |
| 2010/0087241 A1 | 4/2010 | Nguyen et al. |
| 2010/0090963 A1 | 4/2010 | Dubs et al. |
| 2010/0110025 A1 | 5/2010 | Lim |
| 2010/0117978 A1 | 5/2010 | Shirado |
| 2010/0177118 A1 | 7/2010 | Sytnikov et al. |
| 2010/0231612 A1 | 9/2010 | Chaudhri et al. |
| 2010/0232710 A1 | 9/2010 | Ludwig |
| 2010/0289754 A1 | 11/2010 | Sleeman et al. |
| 2010/0302172 A1 | 12/2010 | Wilairat |
| 2010/0315337 A1 | 12/2010 | Ferren et al. |
| 2010/0328032 A1 | 12/2010 | Rofougaran |
| 2011/0007000 A1 | 1/2011 | Lim |
| 2011/0037735 A1 | 2/2011 | Land et al. |
| 2011/0057953 A1 | 3/2011 | Horodezky |
| 2011/0063251 A1 | 3/2011 | Geaghan et al. |
| 2011/0066984 A1 | 3/2011 | Li |
| 2011/0084928 A1 | 4/2011 | Chang et al. |
| 2011/0086706 A1 | 4/2011 | Zalewski |

(56) References Cited

U.S. PATENT DOCUMENTS

| | | |
|---|---|---|
| 2011/0170745 A1 | 7/2011 | Chen et al. |
| 2011/0202889 A1 | 8/2011 | Ludwig |
| 2011/0202934 A1 | 8/2011 | Ludwig |
| 2011/0260998 A1 | 10/2011 | Ludwig |
| 2011/0261049 A1 | 10/2011 | Cardno et al. |
| 2011/0285648 A1 | 11/2011 | Simon |
| 2012/0007821 A1 | 1/2012 | Zaliva |
| 2012/0034978 A1 | 2/2012 | Lim |
| 2012/0050185 A1 | 3/2012 | Davydov et al. |
| 2012/0056846 A1 | 3/2012 | Zaliva |
| 2012/0106782 A1 | 5/2012 | Nathan et al. |
| 2012/0108323 A1 | 5/2012 | Kelly et al. |
| 2012/0133484 A1 | 5/2012 | Griffin |
| 2012/0192119 A1 | 7/2012 | Zaliva |
| 2012/0194461 A1 | 8/2012 | Lim |
| 2012/0194462 A1 | 8/2012 | Lim |
| 2012/0195522 A1 | 8/2012 | Ludwig |
| 2012/0223903 A1 | 9/2012 | Ludwig |
| 2012/0235940 A1 | 9/2012 | Ludwig |
| 2012/0262401 A1 | 10/2012 | Rofougaran |
| 2012/0280927 A1 | 11/2012 | Ludwig |
| 2012/0317521 A1 | 12/2012 | Ludwig |
| 2013/0004016 A1 | 1/2013 | Karakotsios et al. |
| 2013/0009896 A1 | 1/2013 | Zaliva |
| 2013/0038554 A1 | 2/2013 | West |

FOREIGN PATENT DOCUMENTS

| | | |
|---|---|---|
| EP | 0574213 | 3/1999 |
| EP | 0880091 | 1/2004 |
| JP | 8-76926 | 3/1996 |
| JP | 09-231004 | 9/1997 |
| JP | 11-119911 | 4/1999 |

OTHER PUBLICATIONS

Pilu,M., et al., Training PDMs on models: The Case of Deformable Superellipses, Proceedings of the 7th British Machine Vision Conference, Edinburgh, Scotland, 1996, pp. 373-382, [online] [retrieved on Feb. 28, 2011] URL:https://docs.google.com/viewera=v&pid=explorer&chrome=true&srcid=0BxWzm3JBPnPmNDI1MDIxZGUtNGZhZi00NzJhLWFhZD-MtNTJmYmRiMWYyMjBh&authkey=CPeVx4wO&hl=en.

Polynomial regression, [online] [retrieved on May 12, 2013] http://en.wikipedia.org/wiki/Polynomial-regression, Jul. 24, 2010, 4 pgs.

Prabhakar S., et al., "Learning fingerprint minutiae location and type," http://www.cse.msu.edu/biometrics/Publications/Fingerprint/PrabhakarJainPankanti-MinaLocType-PR03.pdf, Pattern Recognition 36 (8), 1847-1857.

Pressure Profile Systems, Jan. 29, 2011, [online] [retrieved on Jan. 29, 2011] URL: http://www.pressureprofile.com, 1 pg. Principal component analysis, [online] [retrieved on Jun. 26, 2013] URL: http://en.wikipedia.org/wiki/Principal-component-analysis, Feb. 25, 2011, 9 pgs.

"Prewitt," http://en.wikipedia.org/wiki/Prewitt, Mar. 15, 2010, visited Feb. 28, 2011. Prewitt, [online] [retrieved on May 12, 2013] URL: http://en.wikipedia.org/wiki/Prewitt, Mar. 15, 2010, visited Feb. 28, 2011, 2 pgs.

Rekimoto, Jun, "Pick-and-Drop: A Direct Manipulation Technique for Multiple Computer Environments," Sony Computer Science Laboratory Inc., Tokyo, Japan, 1997, http://www.sonycsl.co.jp/person/rekimoto/papers/uist97.pdf, last retrieved on May 30, 2013.

Review of KORG X-230 Drum (later called "Wave Drum"), Electronic Musician, Apr. 1994, 1 pg.

Reyes, E., An Automatic Goodness Index to Measure Fingerprint Minutiae Quality, Progress in Pattern Recognition, Image Analysis and Applications, Lecture Notes in Computer Science vol. 3773, 2005, pp. 578-585.

Rich, Robert "Buchla Lightning MIDI Controller", Electronic Musician, Oct. 1991.

Rich, Robert "Buchla Thunder", Electronic Musician, Aug. 1990.

Roberts Cross, [online] [retrieved on May 12, 2013] URL: http://en.wikipedia.org/wiki/Roberts-Cross, Jul. 20, 2010, visited Feb. 28, 2011, 3 pgs.

Ronse, Christian and Devijver, Pierre A., Connected Components in Binary Images: the Detection Problem, Research Studies Press/ John Wiley & Sons Inc. New York, 1984.

"Sensor Products LLC—Tactile Surface Pressure and Force Sensors," Oct. 26, 2006, http://www.sensorprod.com.

Shapiro, L .S., Affine Analysis of Image Sequences, Cambridge University Press, 1995, 25 pgs.

Snell, J. M., Sensors for Playing Computer Music with Expression, Proceedings of the Intl. Computer Music Conf. at Eastman, 1983, pp. 113-126.

Sobel Operator, [online] [retrieved on May 12, 2013] URL: http://en.wikipedia.org/wiki/Sobel-operator, Mar. 12, 2010, visited Feb. 28, 2011, 5 pgs.

Synaptics, Jan. 28, 2011, [online] [retrieved on May 12, 2013] URL: http://www.synaptics.com, 1 pg.

Tactile Pressure Measurement, Pressure Mapping Systems, and Force Sensors and Measurement Systems, [online] [retrieved on Aug. 6, 2013] URL: http://www.tekscan.com, 2 pgs.

Tactile Surface Pressure and Force Sensors,Sensor Products LLC, Oct. 26, 2006, [online] [retrieved on Aug. 6, 2013] URL: http://www.sensorprod.com, 2 pgs.

Turner, J., Myron Krueger Live, ctheory.net, [online] [retrieved on Nov. 19, 2013] http://www.ctheory.net/articles.aspx?id=328, Jan. 23, 2002, 8 pgs.

Venolia, D., et al., T-Cube: A Fast, Self-Disclosing Pen-Based Alphabet, CHI '94 Proceedings of the SIGCHI Conference on Human Factors in Computing Systems, Apr. 24-28, 1994, pp. 265-270.

VeriFinger Information, [online] [retrieved on Jun. 11, 2013] URL: http://www.fingerprint-it.com/-sol-verifinger.html, 2 pgs.

Verner J., Artif Starr Switch Company Ztar 624-D, Electronic Musician, Nov. 1994, 5 pgs.

Viberg, M., Subspace Fitting Concepts in Sensor Array Processing, Linkoping Studies in Science and Technology Dissertations No. 217, 1989, Dept. of Electrical Engineering, Linkoping University, Linkoping, Sweden, 15 pgs.

Videoplace, [online] [retrieved on Nov. 19, 2013] URL: http://en.wikipedia.org/Videoplace, last updated Sep. 3, 2013, 1 pg.

Walker, G., Touch and the Apple iPhone, Veritas et Visus, [online] [retrieved on May 12, 2013] URL: http://www.veritasetvisus.com/VVTP-12,%20Walker.pdf, Feb. 2007, pp. 50-54.

Want, R., et al., The PARCTAB ubiquitous computing experiment, 1995-1996, [online] [retrieved on Jun. 10, 2013] URL: http://www.ece.rutgers.edu/~parashar/Classes/02-03/ece572/perv-reading/the-parctab-ubiquitous-computing.pdf, 44 pgs.

Wilson, T.V., How the iPhone Works, howstuffworks, [online] [retrieved on May 12, 2013] URL: http://electronics.howstuffworks.com/iphone2.htm, Jan. 8, 2011, 11 pgs.

Wu, Y., et al., Vision-Based Gesture Recognition: A Review, Lecture Notes in Computer Science, Gesture Workshop, 1999, 12 pgs, [online] [retrieved May 21, 2014] URL: http://www.google.com/url?sa=t&rct=j&q=&esrc=s&source=web&cd=1&ved=0CC0QFjAA&url=http%3A%2F%2Fwww.ece.northwestern.edu%2F~yingwu%2Fpapers%2Fconference%2F1999%2Fgw99.pdf&ei=DSJ9U7EFyryhBJfKgsAN&usg=AFQCNFLIko3GnUOZbQQ5dLr8WsXQSE3Fg&bvm=bv.67651124,d.cGU.

Xsensor Technology Corporation, Feb. 7, 2011, [online] [retrieved on May 12, 2013] URL: http://www.xsensor.com, 1 pg.

Davis, R. C., et al., NotePals: Lightweight Note Taking by the Group, for the Group, University of California, Berkeley, Computer Science Division, 1998, 8 pgs.

Feb. 27, 2014 USPTO Non-Final Office Action in U.S. Appl. No. 13/038,365.

Buxton, Bill, Multi-Touch Systems That I Have Known and Loved, http://www.billbuxton.com/multitouchOverview.html, Jun. 12, 2014.

Hauptmann, Alexander G., Speech and Gestures for Graphic Image Manipulation, Dept. of Computer Science, Carnegie Mellon University, 1989.

(56) References Cited

OTHER PUBLICATIONS

Hauptmann, Alexander G.; McAvinney, Paul; Shepard, Sharon R., Gesture Analysis for Graphic Manipulation, Carnegie Mellon University Research Showcase @CMU, 1988.
Minsky, Margaret R., Manipulating Simulated Objects with Real-world Gestures using a Force and Position Sensitive Screen, Atari Cambridge Research, MIT, Jul. 1984.
Rubine, Dean and McAvinney, Paul, Programmable Finger-tracking Instrument Controllers, The MIT Press, Computer Music Journal, vol. 14, No. 1, Spring 1990.
Rubine, Dean Harris, The Automatic Recognition of Gestures, CMU-CS-91-202, Dec. 1991.
Rubine, Dean, Combining Gestures and Direct Manipulation, Information Technology Center, Carnegie Mellon University, May 3-7, 1992.
Rubine, Dean, Specifying Gestures by Example, Information Technology Center, Carnegie Mellon University, Computer Graphics, vol. 25, No. 4, Jul. 1991.
Westerman, Wayne, Hand Tracking, Finger Identification, and Chordic Manipulation on a Multi-Touch Surface, Spring 1999.
Jan. 4, 2013 USPTO Office Action (U.S. Appl. No. 13/549,285)—Our Matter 5308.
Oct. 8, 2013 USPTO Office Action (U.S. Appl. No. 11/761,978)—Our Matter 5306.
Oct. 16, 2014 USPTO Office Action (U.S. Appl. No. 14/292,770)—Our Matter 5317.
Nov. 10, 2011 USPTO Office Action (U.S. Appl. No. 11/761,978)—Our Matter 5306.
Dec. 10, 2010 USPTO Office Action (U.S. Appl. No. 11/761,978)—Our Matter 5306.
Dec. 20, 2013 USPTO Office Action (U.S. Appl. No. 13/794,138)—Our Matter 5311.
Feb. 5, 2013 USPTO Office Action (U.S. Appl. No. 13/470,725)—Our Matter 5309.
Feb. 26, 2014 USPTO Office Action (U.S. Appl. No. 14/141,257)—Our Matter 5312.
Feb. 26, 2014 USPTO Office Action (U.S. Appl. No. 14/141,297)—Our Matter 5313.
Feb. 9, 2015 USPTO Office Action (U.S. Appl. No. 11/004,449)—Our Matter 5321.
Mar. 14, 2014 USPTO Office Action (U.S. Appl. No. 14/160,505)—Our Matter 5307.
Mar. 11, 2014 USPTO Office Action (U.S. Appl. No. 14/141,328)—Our Matter 5314.
Mar. 13, 2014 USPTO Office Action (U.S. Appl. No. 14/160,511)—Our Matter 5315.
Mar. 22, 2010 USPTO Office Action (U.S. Appl. No. 11/761,978)—Our Matter 5306.
Apr. 10, 2014 USPTO Office Action (U.S. Appl. No. 13/794,138)—Our Matter 5311.
May 22, 2014 USPTO Office Action (U.S. Appl. No. 14/229,681)—Our Matter 5318.
Jun. 17, 2013 USPTO Office Action (U.S. Appl. No. 13/794,138)—Our Matter 5311.
Jun. 20, 2011 USPTO Office Action (U.S. Appl. No. 11/761,978)—Our Matter 5306.
Jul. 15, 2013 USPTO Office Action (U.S. Appl. No. 13/470,725)—Our Matter 5309.
Jul. 15, 2013 USPTO Office Action (U.S. Appl. No. 13/549,285)—Our Matter 5308.
Jul. 2, 2014 USPTO Office Action (U.S. Appl. No. 14/141,257)—Our Matter 5312.
Jul. 24, 2014 USPTO Office Action (U.S. Appl. No. 14/141,328)—Our Matter 5314.
Jul. 25, 2014 USPTO Office Action (U.S. Appl. No. 14/292,770)—Our Matter 5317.
Sep. 13, 2012 USPTO Office Action (U.S. Appl. No. 13/549,285)—Our Matter 5308.
Sep. 26, 2014 USPTO Office Action (U.S. Appl. No. 14/229,681)—Our Matter 5318.
Sep. 30, 2013 USPTO Office Action (U.S. Appl. No. 13/794,138)—Our Matter 5311.
USPTO Notice of Allowance dated Dec. 24, 2002 issued in U.S. Appl. No. 09/812,870, filed Mar. 19, 2001.
USPTO Non-Final Office Action Dated Feb. 27, 2014, in U.S. Appl. No. 13/038,365.
USPTO Notice of Allowance dated Jan. 10, 2008 issued in U.S. Appl. No. 10/683,914, filed Oct. 10, 2003.
USPTO Notice of Allowance dated Feb. 10, 2014 issued in U.S. Appl. No. 13/180,512, filed Jul. 11, 2011.
USPTO Notice of Allowance dated Mar. 12, 2012 issued in U.S. Appl. No. 12/511,930, filed Jul. 29, 2009.
USPTO Notice of Allowance dated Mar. 20, 2012 issued in U.S. Appl. No. 12/724,413, filed Mar. 15, 2010.
USPTO Notice of Allowance dated May 8, 2013 issued in U.S. Appl. No. 12/541,948, filed Aug. 15, 2009.
USPTO Notice of Allowance dated May 16, 2013 issued in U.S. Appl. No. 13/441,842, filed Apr. 7, 2012.
USPTO Notice of Allowance dated May 24, 2013 issued in U.S. Appl. No. 13/442,815, filed Apr. 9, 2012.
USPTO Notice of Allowance dated May 30, 2013 issued in U.S. Appl. No. 13/442,806, filed Apr. 9, 2012.
USPTO Notice of Allowance dated Sep. 13, 2013 issued in U.S. Appl. No. 13/846,830, filed Mar. 18, 2013.
USPTO Notice of Allowance dated Jun. 20, 2014 issued in U.S. Appl. No. 14/141,297, filed Dec. 26, 2013.
USPTO Notice of Allowance dated Dec. 26, 2013 issued in U.S. Appl. No. 13/549,285, filed Jul. 13, 2012.
USPTO Notice of Allowance dated Sep. 11, 2013 issued in U.S. Appl. No. 13/786,265, filed Mar. 5, 2013.
USPTO Notice of Allowance dated Sep. 18, 2013 issued in U.S. Appl. No. 13/786,346, filed Mar. 5, 2013.
USPTO Notice of Allowance dated Nov. 9, 2012 issued in U.S. Appl. No. 12/502,230, filed Jul. 13, 2009.
USPTO Notice of Allowance dated Dec. 6, 2013 issued in U.S. Appl. No. 13/731,946, filed Dec. 31, 2012.
USPTO Notice of Allowance dated Dec. 19, 2013 issued in U.S. Appl. No. 11/761,978, filed Jun. 12, 2007.
Artmuseum.net, Pioneers, Myron Krueger, Responsive 1970, [online] [retrieved on Nov. 19, 2013] URL: http://web.archive.org/web/20070929094921/http://www.artmuseum.net/w2vr/timeline/Krueger.html, Sep. 29, 2007, 1 pg.
Balda AG, Feb. 26, 2011, [online] [retrieved on May 12, 2013] URL: http://www.balda.de, 1 pg. "Balda AG," Feb. 26, 2011, http://www.balda.de.
Alonso-Fernandez, F., et al., Fingerprint Recognition, Chapter 4, Guide to Biometric Reference Systems and Performance Evaluation, (Springer, London, 2009, pp. 51-90, [online] [retrieved on Jun. 2, 2013] URL: http://www2.hh.se/staff/josef/public/publications/alonso-fernandez09chapter.pdf.
Bishop, C.M., Pattern Recognition and Machine Learning, Springer New York, 2006, pp. 561-593.
Bormans, J., MPEG-4 Systems Need Specialized CPUs, EE Times, Jan. 25, 1999, [retrieved Sep. 5, 2013] URL: http://www.eetimes.com/document.asp?doc-id=1224500, 2 pgs.
Buxton, W. A. S., Two-Handed Document Navigation, Xerox Disclosure Journal, 19(2), Mar./Apr. 1994 [online] URL: http://www.billbuxton.com/2Hnavigation.html, pp. 103-108.
Canny edge detector, [online] [retrieved on May 12, 2013] http://en.wikipedia.org/wiki/Canny-edge-detector, Mar. 5, 2010, 4 pgs.
Central Moment, Dec. 16, 2009, [online] [retrieved on Oct. 26, 2010] URL: http://en.wikipedia.org/w/index.php?title=Central-moment&oldid=332048374.
Cipolla, R., et al., Computer Vision for Human-Machine Interaction, Cambridge University Press, 1988, pp. 23-51, 97-122, 135-153, 191-265, 291-311.
Coefficient of variation, [online] [retrieved on May 12, 2013] URL: http://en.wikipedia.org/wiki/Coefficient-of-variation, Feb. 15, 2010, visited Feb. 28, 2011, 2 pgs.
Cypress Semiconductor, Feb. 28, 2011, [online] [retrieved on May 12, 2013] URL: http://www.cypress.com, 1 pg.
Dario P., et al., Tactile sensors and the gripping challenge, IEEE Spectrum, vol. 5, No. 22, Aug. 1985, pp. 46-52.

(56) References Cited

OTHER PUBLICATIONS

Davis, R. C., et al., NotePals: Lightweight Note Sharing by the Group, for the Group, [online] [retrieved on Jun. 2, 2013] URL: http://dub.washington.edu:2007/projects/notepals/pubs/notepals-chi99-final.pdf, 9 pgs.
Digiose, N., Biometric Touchscreen Recognizes Your Fingerprints, Hearst Electronic Products, Jul. 24, 2013, [online] [retreived on Jul. 31, 2013] URL: http://www.electronicproducts.com/Sensors-and-Transducers/Sensors-and-Transducers/Biometric-Touchscreen-Recognizes-Your-Fingerprints.aspx.
DIY Touchscreen Analysis, MOTO, [online] [retrieved on May 12, 2013] URL: http://labs.moto.com/diy-touchscreen-analysis/, Jul. 15, 2010, 23 pgs.
Dulberg, M. S., et al. An Imprecise Mouse Gesture for the Fast Activation of Controls, IOS Press, Aug. 1999, [online] [retrieved on Jul. 9, 2013] URL: http://www.csc.ncsu.edu/faculty/stamant/papers/interact.pdf.gz, 10 pgs.
Electronic Statistics Textbook, StatSoft, Inc., 2011, [online] [retrieved on Jul. 1, 2011] URL: http://www.statsoft.com/textbook, 1 pg.
Pavlovic, V. I., et al., Visual Interpretation of Hand Gestures of Human-Computer Interacton: A Review, IIEE Transactions on Pattern Analysis and Machine Intelligence, Jul. 1987, 19(7), pp. 677-695.
Euler Angles, 2011, [online] [retrieved on Jun. 30, 2011] URL: http://en.wikipedia.org/w/index.php?title=Euler-angles &oldid=436460926, 8 pgs.
Fang, Y., et al., Dynamics of a Winner-Take-All Neural Network, Neural Networks, 9(7), Oct. 1996, pp. 1141-1154.
Garcia Reyes, E., An Automatic Goodness Index to Measure Fingerprint Minutiae Quality, Progress in Pattern Recognition, Image Analysis and Applications, Lecture Notes in Computer Science vol. 3773, 2005, pp. 578-585, [online] [retrieved on Jun. 2, 2013] URL: http://www.researchgate.net/publication/226946511-An-Automatic-Goodness-Index-to-Measure-Fingerprint-Minutiae-Quality/file/ d912f50ba5e96320d5.pdf.
Otsu's method, [online] [retrieved on Jun. 26, 2013] URL: http://en.wikipedia.org/wiki/Otsu-method, Sep. 13, 2010, 2 pgs.
Haken, L., An Indiscrete Music Keyboard, Computer Music Journal, Spring 1998, pp. 30-48.
Han, J., Multi-Touch Sensing through LED Matrix Displays (video), [online] [retrieved on May 12, 2013] "http://cs.nyu.edu/~jhan/ledtouch/index.html," Feb. 18, 2011, 1 pg.
Hara, Y., Matsushita demos multilayer MPEG-4 compression, Electronic Engineering times, Apr. 19, 1999, 1 pg.
Hernandez-Leon, R., et al., Classifying using Specific Rules with High Confidence, 9th Mexican International Conference on Artificial Intelligence, IEEE, Nov. 2010, pp. 75-80.
Holz, C., et al., Fiberio: A Touchscreen that Senses Fingerprints, Proceedings of the 26th Annual ACM Symposium on User Interface Software and Technology (UIST '13), Oct. 8-11, 2013, 5 pgs. [Jun. 11, 2014] [online] URL: http://www.christianholz.net/fiberio.html.
Hough transform, [online] [retrieved on Feb. 13, 2010] URL: http://en.wikipedia.org/wiki/Hough-transform, Feb. 13, 2010, 7 pgs.
Igel, C., et al., Improving the Rprop Learning Algorithm, Proceedings of the Second International ICSC Symposium on Neural Computation (NC 2000), 2000, [online] [retrieved on Jun. 2, 2013] URL: http://citeseerx.ist.psu.edu/viewdoc/download?doi=10.1.1.17.3899 &rep=rep1&type=pdf, pp. 115-121.
Johnson, C., Image sensor tracks moving objects in hardware, Electronic Engineering Times, Apr. 5, 1999, 1 pg.
Johnson, Colin "Computer program recognizes facial expressions", Electronic Engineering Times, Apr. 12, 1999.
Kaoss pad dynamic effect/controller, Korg Proview Users' magazine Summer 1999, 2 pgs.
Kayaoglu, M., et al., Standard Fingerprint Databases: Manual Minutiae Labeling and Matcher Performance Analyses, arXiv preprint arXiv:1305.1443, 2013, 14 pgs, [online] [retrieved on Jun. 2, 2013] URL: http://arxiv.org/ftp/arxiv/papers/1305/1305.1443.pdf.
Krueger, M. W., ACM Siggraph Touchware, Pioneers, [online] [retrieved on Nov. 19, 2013] URL: http://www.siggraph.org/artdesign/gallery/S98/pione/pione3/krueger.html, last updated 1999, 1 pg.
Krueger, M., Artmuseum.net, Pioneers, Responsive 1970, [online] [retrieved on Nov. 19, 2013] URL: http://web.archive.org/web/20070929094921/http://www.artmuseum.net/w2vr/timeline/Krueger.html, Sep. 29, 2007, 1 pg.
Leiberman, D., Touch screens extend grasp Into consumer realm, Electronic Engineering Times, Feb. 8, 1999.
"Lim, Agrawal, and Nekludova" "A Fast Parallel Algorithm for Labelling Connected Components in Image Arrays" ", Technical Report Series, No. NA86-2, Thinking Machines Corp., 1986 (rev. 1987),Cambridge, Mass., USA.".
Lippold Haken, "An Indiscrete Music Keyboard," Computer Music Journal, Spring 1998, pp. 30-48.
Local regression, Nov. 16, 2010, [online] [retrieved on Jun. 28, 2011] URL: http://en.wikipedia.org/w/index.php?title=Local-regression &oldid=416762287.
Marks, P., Biometric Touchscreen Recognises Prints for First Time, New Scientist, Jul. 17, 2013, Issue 2926, 3 pgs. [online] [retrieved Jun. 11, 2013] URL: http://www.newscientist.com/article/mg21929266.300?full=true&print=true#.U5n1uBA9WHN.
Moog, R. A., The Human Finger—A Versatile Electronic Music Instrument Component, Audio Engineering Society Preprint, 1977, New York, NY, 4 pgs.
Pennywitt, Kirk "Robotic Tactile Sensing," Byte, Jan. 1986.
Moyle, Michael, et al. "A Flick in the Right Direction: A Case Study of Gestural Input." Conferences in Research and Practice in Information Technology, vol. 18, Jan. 2005; New Zealand.
Nguyen, N., et al., Comparisons of sequence labeling algorithms and extensions, Proceedings of the 24th International Conference on Machine Learning, 2007, [online] [retrieved on Jun. 2, 2013] URL: http://www.cs.cornell.edu/~nhnguyen/icml07structured.pdf, pp. 681-688.
Nissen, S., Implementation of a Fast Artificial Neural Network Library (FANN), Department of Computer Science University of Copenhagen (DIKU)), Oct. 31, 2003, [online] [retrieved on Jun. 21, 2013] URL: http://mirror.transact.net.au/sourceforge/f/project/fa/fann/fann-doc/1.0/fann-doc-complete-1.0.pdf, 92 pgs.
Osian, M., et al., Fitting Superellipses to Incomplete Contours, IEEE Computer Society Conference on Computer Vision and Pattern Recognition Workshops (CVPRW '04), Jun. 2004, 8 pgs.

\* cited by examiner

TOUCH SCREEN APPARATUS FOR RECOGNIZING A TOUCH GESTURE

CROSS REFERENCE TO RELATED APPLICATIONS

This application is a continuation of U.S. application Ser. No. 11/761,978, filed Jun. 12, 2007, which is a continuation of U.S. application Ser. No. 09/812,400, filed Mar. 19, 2001, now U.S. Pat. No. 7,786,370, issued Aug. 31, 2010, which is a division of U.S. application Ser. No. 09/313,533, filed May 15, 1999, now U.S. Pat. No. 6,610,917, issued Aug. 26, 2003, which claims benefit of priority of U.S. provisional application Ser. No. 60/085,713, filed May 15, 1998.

This application is also related to U.S. application Ser. No. 13/470,725, filed May 14, 2012.

FIELD OF INVENTION

The present invention relates generally to a control system, and in particular, to a tactile input controller for controlling an associated system.

SUMMARY OF THE INVENTION

Touchpad user interfaces for controlling external systems such as computers, machinery, and process environments via at least three independent control signals. The touchpad may be operated by hand, other parts of the body, or inanimate objects. Such an interface affords a wide range of uses in computer applications, machine and process control, and assistance to the disabled. In one embodiment simple contact position-sensing touchpads, producing control signals responsive to a contact region, are enhanced to provide several independent control signals. Enhancements may include velocity sensors, pressure sensors, and electronic configurations measuring contact region widths. Touch-screens positioned over visual displays may be adapted. According to other aspects pressure-sensor array touchpads are combined with image processing to responsively calculate parameters from contact regions. Six independent control parameters can be derived from each region of contact. These may be easily manipulated by a user. In one implementation, smaller pressure-sensor arrays are combined with data acquisition and processing into a chip that can be tiled in an array.

DESCRIPTION OF THE DRAWINGS

The above and other aspects, features and advantages of the present invention will become more apparent upon consideration of the following description of preferred embodiments taken in conjunction with the accompanying drawing figures, wherein.

DETAILED DESCRIPTION

Overview

Figure 1:
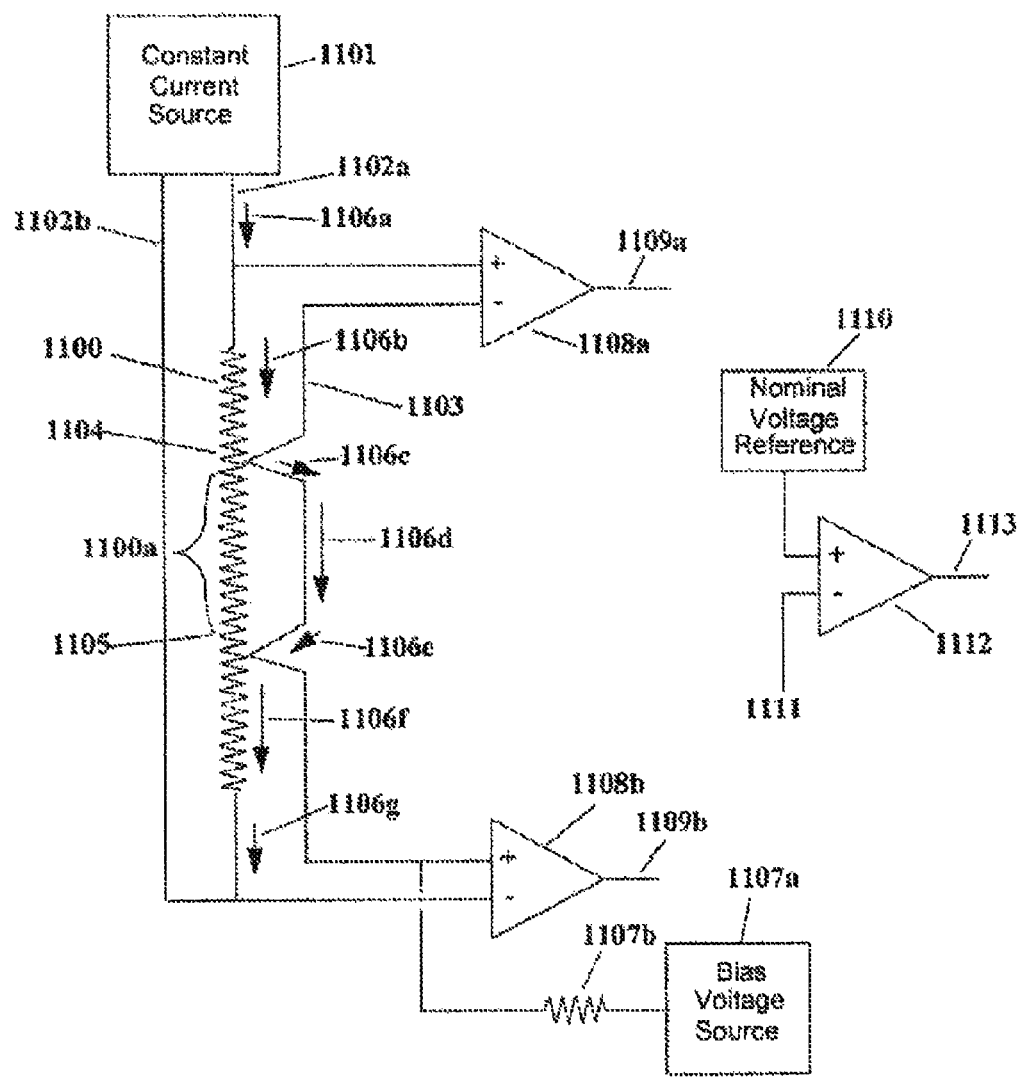
FIG. 1 shows an example of how two independent contact points can be independently discerned, or the dimensional-width of a single contact point can be discerned, for a resistance null/contact controller with a single conductive contact plate or wire and one or more resistive elements whose resistance per unit length is a fixed constant through each resistive element.

Described herein are two kinds of novel touch-pads. Null/contact touchpads are contact-position sensing devices that normally are in a null state unless touched and produce a control signal when touched whose signal value corresponds to typically one unique position on the touch-pad. A first enhancement is the addition of velocity and/or pressure sensing. A second enhancement is the ability to either discern each dimensional-width of a single contact area or, alternatively, independently discern two independent contact points in certain types of null/contact controllers. A third possible enhancement is that of employing a touch-screen instance of null/contact touch pad and positioning it over a video display.

The invention also provides for a pressure-sensor array touch-pad. A pressure-sensor array touch-pad of appropriate sensitivity range, appropriate "pixel" resolution, and appropriate physical size is capable of measuring pressure gradients of many parts of the human hand or foot simultaneously. A pressure-sensor array touch-pad can be combined with image processing to assign parameterized interpretations to measured pressure gradients and output those parameters as control signals. The pressure-sensor "pixels" of a pressure-sensor array are interfaced to a data acquisition stage; the data acquisition state looks for sensor pixel pressure measurement values that exceed a low-level noise-rejection/deformity-reject threshold; contiguous regions of sufficiently high pressure values are defined; the full collection of region boundaries are subjected to classification tests; various parameters are derived from each independent region; and these parameters are assigned to the role of specific control signals which are then output to a signal routing, processing, and synthesis entity.

It is possible to derive a very large number of independent control parameters which are easily manipulated by the operating user. For example, six degrees of freedom can be recovered from the contact of a single finger. A whole hand posture can yield 17 instantaneously and simultaneously measurable parameters which are independently adjustable per hand. The recognized existence and/or derived parameters from postures and gestures may be assigned to specific outgoing control signal formats and ranges. The hand is used throughout as an example, but it is understood that the foot or even other body regions, animal regions, objects, or physical phenomena can replace the role of the hand.

It will be evident to one of ordinary skill in the art that it is advantageous to have large numbers of instantaneously and simultaneously measurable parameters which are independently adjustable. For instance, a symbol in a 2-D CAD drawing can be richly interactively selected and installed or edited in moments as opposed to tens to hundreds of seconds as is required by mouse manipulation of parameters one or two at a time and the necessary mode-changes needed to change the mouse action interpretation. As a result, said touch-pad has applications in computer workstation control, general real-time machine control, computer data entry, and computer simulation environments.

Various hardware implementations are possible. A particularly advantageous implementation would be to implement a small pressure-sensor array together with data acquisition and a small processor into a single chip package that can be laid as tiles in a larger array.

Null/Contact Touch-Pads

Distinguished from panel controls and sensors are what will be termed null/contact touch-pads. This is a class of contact-position sensing devices that normally are in a null state unless touched and produce a control signal when touched whose signal value corresponds to typically one unique position on the touch-pad. Internal position sensing mechanisms may be resistive, capacitive, optical, standing wave, etc. Examples of these devices include one-dimensional-sensing ribbon controllers found on early music synthesizers, two-dimensional-sensing pads such as the early Kawala pad and more modern mini-pads found on some lap-top computers, and two-dimensional-sensing see-through touch-screens often employed in public computer kiosks.

The null condition, when the pad is untouched, requires and/or provides the opportunity for special handling. Some example ways to handle the untouched condition include:
- sample-hold (hold values issued last time sensor was touched, as does a joystick)
- bias (issue maximal-range value, minimal-range value, mid-range value, or other value)
- touch-detect on another channel (i.e., a separate out-of-band "gate" channel).

Additional enhancements can be added to the adaptation of null/contact touch-pad controllers as instrument elements. A first enhancement is, the addition of velocity and/or pressure sensing. This can be done via global impact and/or pressure-sensors. An extreme of this is implementation of the null/contact touch-pad controller as a pressure-sensor array; this special case and its many possibilities are described later.

A second enhancement is the ability to either discern each dimensional-width of a single contact area or alternatively, independently discern two independent contact points in certain types of null/contact controllers. FIG. 1 shows an example of how two independent contact points can be independently discerned, or the dimensional-width of a single contact point can be discerned, for a resistance null/contact controller with a single conductive contact plate (as with the Kawala pad product) or wire (as in a some types of ribbon controller products) and one or more resistive elements whose resistance per unit length is a fixed constant through each resistive element. It is understood that a one-dimensional null/contact touch-pad typically has one such resistive element while a two-dimensional null/contact touch-pad typically has two such resistive elements that operate independently in each direction.

Referring to FIG. 1, a constant current source can be applied to the resistive element as a whole, developing a fixed voltage across the entire resistive element. When any portion of the resistive element is contacted by either a non-trivial contiguous width and/or multiple points of contact, part of the resistive element is shorted out, thus reducing the overall width-to-end resistance of the resistance element. Because of the constant current source, the voltage developed across the entire resistive element drops by an amount equal to the portion of the resistance that is shorted out.

The value of the voltage drop then equals a value in proportion to the distance separating the extremes of the wide and/or multiple contact points. By subtracting the actual voltage across the entire resistive element from the value this voltage is normally, a control voltage proportional to distance separating the extremes of the wide and/or multiple contact points is generated. Simultaneously, the voltage difference between that of the contact plate/wire and that of the end of the resistive element closest to an external contact point is still proportional to the distance from said end to said external contact point. Using at most simple op-amp summing and/or differential amplifiers, a number of potential control voltages can be derived; for example one or more of these continuously-valued signals:
- value of distance difference between external contact points (or "width"; as described above via constant current source, nominal reference voltage, and differential amplifier)
- center of a non-trivial-width region (obtained by simple averaging, i.e., sum with gain of ½)
- value of distance difference between one end of the resistive element and the closest external contact point (simple differential amplifier)
- value of distance difference between the other end of the resistive element and the other external contact point (sum above voltage with "width" voltage with appropriate sign).

Further, through use of simple threshold comparators, specific thresholds of shorted resistive element can be deemed to be, for example, any of a single point contact, a recognized contact region width, two points of contact, etc., producing corresponding discrete-valued control signals. The detection of a width can be treated as a contact event for a second parameter analogous to the single contact detection event described at the beginning. Some example usages of these various continuous and discrete signals are:
- existence of widths or multiple contact points may be used to trigger events or timbre changes
- degree of widths may be used to control degrees of modulation or timbre changes
- independent measurement of each extremal contact point from the same end of the resistive element can be used to independently control two parameters. In the simplest form, one parameter is always larger than another; in more complex implementations, the trajectories of each contact point can be tracked (using a differentiator and controlled parameter assignment switch); as long as they never simultaneously touch, either parameter can vary and be larger or smaller than the other.

It is understood that analogous approaches may be applied to other null/contact touchpad technologies such as capacitive or optical.

A third possible enhancement is that of employing a touch-screen instance of null/contact touch-pad and positioning it over a video display. The video display could for example provide dynamically assigned labels, abstract spatial cues, spatial gradients, line-of-site cues for fixed or motor-controlled lighting, etc. which would be valuable for use in conjunction with the adapted null/contact touch-pad controller.

These various methods of adapted null/contact touch-pad elements can be used stand-alone or arranged in arrays. In addition, they can be used as a component or addendum to instruments featuring other types of instrument elements.

Pressure-Sensor Array Touch-Pads

The invention provides for use of a pressure-sensor array arranged as a touch-pad together with associated image processing. As with the null/contact controller, these pressure-sensor array touch-pads may be used stand-alone or organized into an array of such pads.

It is noted that the inventor's original vision of the below described pressure-sensor array touch-pad was for applications not only in music but also for computer data entry, computer simulation environments, and real-time machine control, applications to which the below described pressure-sensor array touch-pad clearly can also apply.

Figure 2:
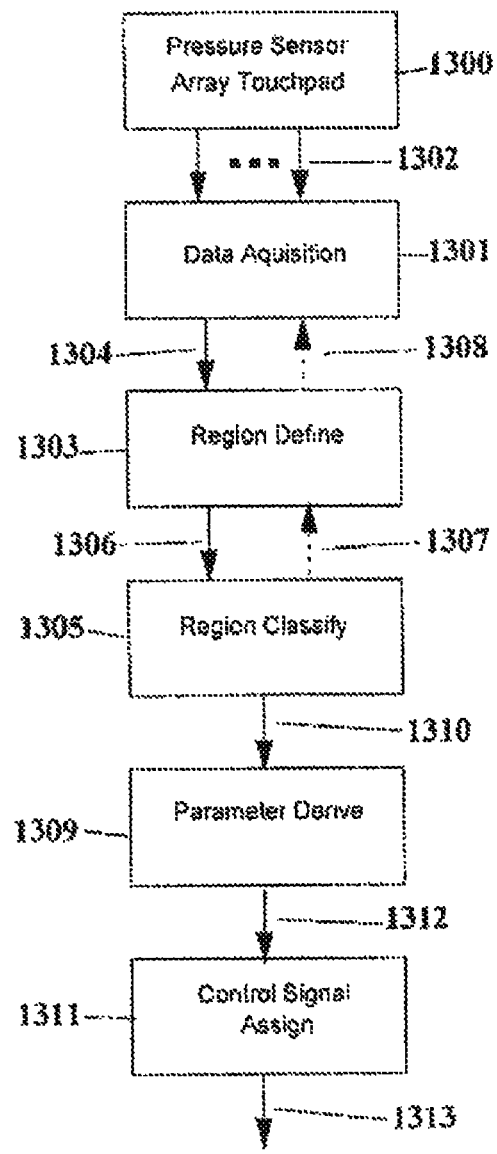
FIG. 2 shows how a pressure-sensor array touch-pad can be combined with image processing to assign parameterized interpretations to measured pressure gradients and output those parameters as control signals.

A pressure-sensor array touch-pad of appropriate sensitivity range, appropriate "pixel" resolution, and appropriate physical size is capable of measuring pressure gradients of many parts of the flexibly-rich human hand or foot simultaneously. FIG. 2 shows how a pressure sensor array touch-pad can be combined with image processing to assign parameterized interpretations to measured pressure gradients and output those parameters as control signals.

The pressure-sensor "pixels" of a pressure-sensor array touch-pad 1300 are interfaced to a data acquisition stage 1301. The interfacing method may be fully parallel but in practice may be advantageously scanned at a sufficiently high rate to give good dynamic response to rapidly changing human touch gestures. To avoid the need for a buffer amplifier for each pressure-sensor pixel, electrical design may carefully balance parasitic capacitance of the scanned array with the electrical characteristics of the sensors and the scan rates; electrical scanning frequencies can be reduced by partitioning the entire array into distinct parts that are scanned in parallel so as to increase the tolerance for address settling times and other limiting processes.

Alternatively, the pressure-sensor array 1300 may be fabricated in such a way that buffer amplifier arrays can be inexpensively attached to the sensor array 1300, or the sensors may be such that each contains its own buffer amplifier; under these conditions, design restrictions on scanning can be relaxed and operate at higher speeds. Although the pressure sensors may be likely analog in nature, a further enhancement would be to use digital-output pressure-sensor elements or sub-arrays.

The data acquisition stage 1301 looks for sensor pixel pressure measurement values that exceed a low-level noise-rejection/deformity-rejection threshold. The sufficiently high pressure value of each such sensor pixel is noted along with the relative physical location of that pixel (known via the pixel address). This noted information may be stored "raw" for later processing and/or may be subjected to simple boundary tests and then folded into appropriate running calculations as will be described below. In general, the pressure values and addresses of sufficiently high pressure value pixels are presented to a sequence of processing functions which may be performed on the noted information:
  contiguous regions of sufficiently high pressure values are defined (a number of simple run-time adjacency tests can be used; many are known—see for example [Ronse; Viberg; Shaperio; Hara])
  the full collection of region boundaries are subjected to classification tests; in cases a given contiguous region may be split into a plurality of tangent or co-bordered independently recognized regions
  various parameters are derived from each independent region, for example geometric center, center of pressure, average pressure, total size, angle-of-rotation-from reference for non-round regions, second-order and higher-order geometric moments, second-order and higher-order pressure moments, etc.
  assignment of these parameters to the role of specific control signals (note events, control parameters, etc.) which are then output to a signal routing, processing, and synthesis entity; for example, this may be done in the form of MIDI messages.

Because of the number of processes involved in such a pipeline, it is advantageous to follow a data acquisition stage 1301 with one or more additional processing stages 1303, 1305, 1309, and 1311. Of the four example processing functions just listed, the first three fall in the character of image processing. It is also possible to do a considerable amount of the image processing steps actually within the data acquisition step, namely any of simple adjacency tests and folding selected address and pressure measurement information into running sums or other running pre-calculations later used to derive aforementioned parameters. The latter method can be greatly advantageous as it can significantly collapses the amount of data to be stored.

Regardless of whether portions of the image processing are done within or beyond the data acquisition stage, there are various hardware implementations possible. One hardware approach would involve very simple front-end scanned data acquisition hardware and a single high-throughput microprocessor/signal-processor chip. Alternatively, an expanded data acquisition stage may be implemented in high-performance dedicated function hardware and this would be connected to a lower performance processor chip. A third, particularly advantageous implementation would be to implement a small pressure-sensor array together with data acquisition and a small processor into a single low-profile chip package that can be laid as tiles in a nearly seamless larger array. In such an implementation all image processing could in fact be done via straightforward partitions into message-passing distributed algorithms.

One or more individual chips could direct output parameter streams to an output processor which would organize and/or assign parameters to output control channels, perhaps in a programmable manner under selectable stored program control. A tiled macro array of such "sensor mini-array" chips could be networkedsby a tapped passive bus, one- or two-dimensional mode active bus daisy-chain, a potentially expandable star-wired centralized message passing chip or subsystem, or other means.

Figure 3:
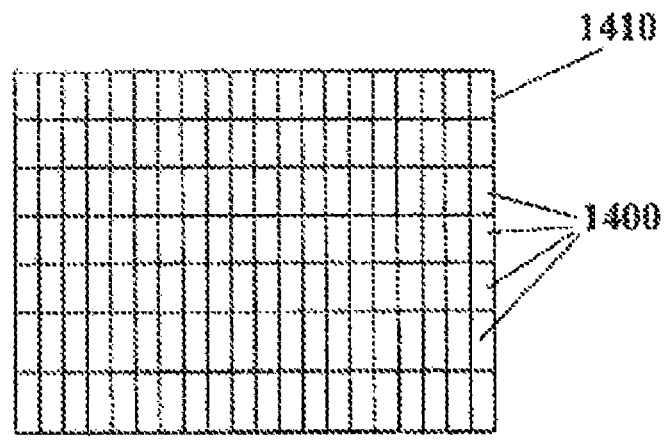
FIG. 3 illustrates the positioning and networking of pressure sensing and processing "mini-array" chips in larger contiguous structures.

Creating a large surface from such "tile chips" will aid in the serviceability of the surface. Since these chips can be used as tiles to build a variety of shapes, it is therefore possible to leverage a significant manufacturing economy-of-scale so as to minimize cost and justify more extensive feature development. Advanced seating and connector technologies, as used in laptops and other high-performance miniature consumer electronics, can be used to minimize the separation between adjacent chip "tiles" and resultant irregularities in the tiled-surface smoothness. A tiled implementation may also include a thin rugged flexible protective film that separates the sensor chips from the outside world. FIG. 3 illustrates the positioning and networking of pressure sensing and processing "mini-array" chips 1400 in larger contiguous structures 1410.

With the perfection of a translucent pressure-sensor array, it further becomes possible for translucent pressure-sensor arrays to be laid atop aligned visual displays such as LCDs, florescent, plasma, CRTs, etc. as was discussed above for null/contact touch-pads. The displays can be used to label areas of the sensor array, illustrate gradients, etc. Note that in the "tile chip" implementation, monochrome or color display areas may indeed be built into each chip.

Returning now to the concept of a pressure-sensor array touch-pad large enough for hand-operation: examples of hand contact that may be recognized, example methods for how these may be translated into control parameters, and examples of how these all may be used are now described. In the below the hand is used throughout as an example, but it is understood that the foot or even other body regions, animal regions, objects, or physical phenomena can replace the role of the hand in these illustrative examples.

Figure 4:
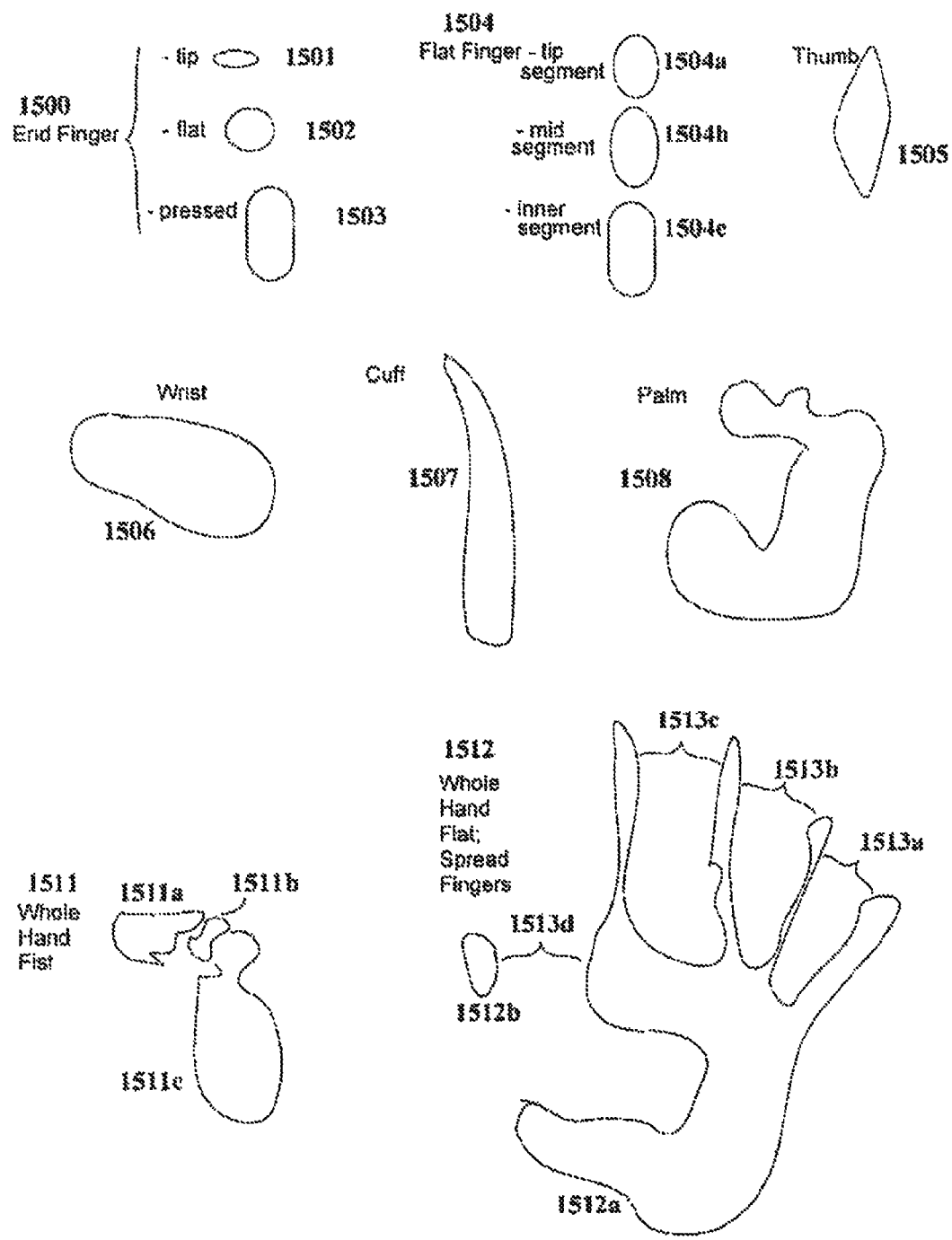
FIG. 4 illustrates the pressure profiles for a number of example hand contacts with a pressure-sensor array.

FIG. 4 illustrates the pressure profiles for a number of example hand contacts with a pressure-sensor array. In the case 1500 of a finger's end, pressure on the touch-pad pressure-sensor array can be limited to the finger tip, resulting in a spatial pressure distribution profile 1501; this shape does not change much as a function of pressure. Alternatively, the finger can contact the pad with its flat region, resulting in light pressure profiles 1502 which are smaller in size than heavier pressure profiles 1503. In the case 1504 where the entire finger touches the pad, a three-segment pattern (1504a, 1504b, 1504c) will result under many conditions; under light pressure a two segment pattern (1504b or 1504c missing) could result. In all but the lightest pressures the thumb makes a somewhat discernible shape 1505 as do the wrist 1506, cuff 1507, and palm 1508; at light pressures these patterns thin and can also break into disconnected regions. Whole hand patterns such as the first 1511 and flat hand 1512 have more complex shapes. In the case of the first 1511, a degree of curl can be discerned from the relative geometry and separation of sub-regions (here depicted, as an example, as 1511a, 1511b, and 1511c). In the case of the whole flat hand 1512, there can be two or more sub-regions which may be in fact joined (as within 1512a) and/or disconnected (as an example, as 1512a and 1512b are); the whole hand also affords individual measurement of separation "angles" among the digits and thumb (1513a, 1513b, 1513c, 1513d) which can easily be varied by the user.

Relatively simple pattern recognition software can be used to discern these and other hand contact patterns which will be termed "postures." The pattern recognition working together with simple image processing may, further, derive a very large number of independent control parameters which are easily manipulated by the operating user. In many cases it may be advantageous to train a system to the particulars of a specific person's hand(s) and/or specific postures. In other situations the system may be designed to be fully adaptive and adjust to a person's hand automatically. In practice, for the widest range of control and accuracy, both training and ongoing adaptation may be useful. Further, the recognized postures described thus far may be combined in sequence with specific dynamic variations among them (such as a finger flick, double-tap, etc.) and as such may be also recognized and thus treated as an additional type of recognized pattern; such sequential dynamics among postures will be termed "gestures."

The admission of gestures further allows for the derivation of additional patterns such as the degree or rate of variation within one or more of the gesture dynamics. Finally, the recognized existence and/or derived parameters from postures and gestures may be assigned to specific outgoing control signal formats and ranges. Any training information and/or control signal assignment information may be stored and recalled for one or more players via stored program control.

For each recognized pattern, the amount of information that can be derived as parameters is in general very high. For the human hand or foot, there are, typically, artifacts such as shape variation due to elastic tissue deformation that permit recovery of up to all six degrees of freedom allowed in an object's orientation in 3-space.

Figure 5:
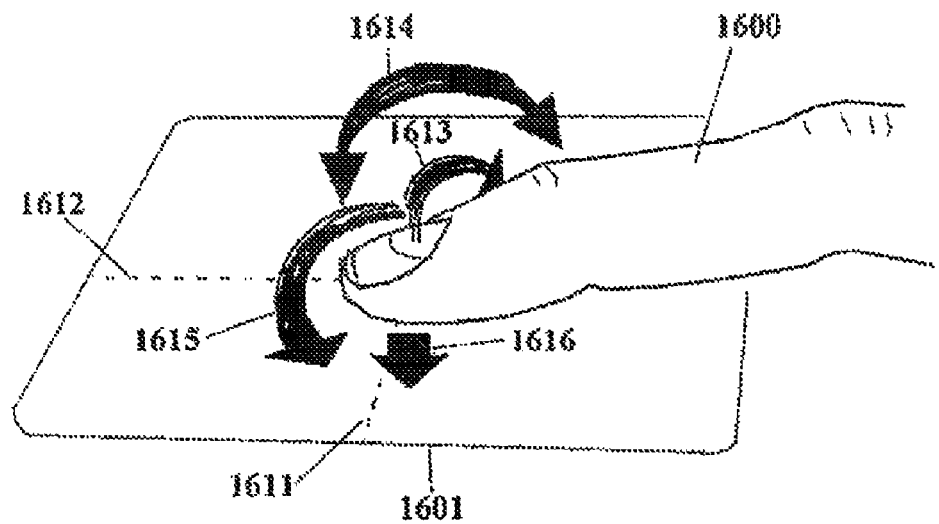
FIG. 5 illustrates how six degrees of freedom can be recovered from the contact of a single finger.

FIG. 5 illustrates how six degrees of freedom can be recovered from the contact of a single finger. In the drawing, the finger 1600 makes contact with the touch-pad 1601 with its end segment at a point on the touch-pad surface determined by coordinates 1611 and 1612 (these would be, for example, left/right for 1611 and forward/backward for 1612). Fixing this point of contact, the finger 1600 is also capable of rotational twisting along its length 1613 as well as rocking back and forth 1614. The entire finger can also be pivoted with motion 1615 about the contact point defined by coordinates 1611 and 1612. These are all clearly independently controlled actions, and yet it is still possible in any configuration of these thus far five degrees of freedom, to vary the overall pressure 1616 applied to the contact point. Simple practice, if it is even needed, allows the latter overall pressure 1616 to be independently fixed or varied by the human operator as other parameters are adjusted.

In general other and more complex hand contacts, such as use of two fingers, the whole hand, etc. forfeit some of these example degrees of freedom but often introduce others. For example, in the quite constrained case of a whole hand posture, the fingers and thumb can exert pressure independently (5 parameters), the finger and thumb separation angles can be varied (4 parameters), the finger ends 1504a can exert pressure independently from the middle 1504b and inner 1504c segments (4 parameters), the palm can independently vary its applied pressure (1 parameter) while independently tilting/rocking in two directions (2 parameters) and the thumb can curl (1 parameter), yielding 17 instantaneously and simultaneously measurable parameters which are independently adjustable per hand. Complex contact postures may also be viewed as, or decomposed into, component sub-postures (for example here, as flat-finger contact, palm contact, and thumb contact) which would then derive parameters from each posture independently. For such complex contact postures, recognition as a larger compound posture which may then be decomposed allows for the opportunity to decouple and/or renormalize the parameter extraction in recognition of the special affairs associated with and constraints imposed by specific complex contact postures.

It is noted that the derived parameters may be pre-processed for specific uses. One example of this would be the quantization of a parameter into two or more discrete steps; these could for example be sequentially interpreted as sequential notes of a scale or melody. Another example would be that of warping a parameter range as measured to one with a more musically expressive layout.

Next examples of the rich metaphorical aspects of interacting with the pressuresensor array touch-pad are illustrated. In many cases there may be one or more natural geometric metaphor(s) applicable, such as associating left-right position, left-right twisting, or left-right rotation with stereo panning, or in associating overall pressure with volume or spectral complexity. In more abstract cases, there may be pairs of parameters that go together—here, for example with a finger end, it may be natural to associate one parameter pair with (left/right and forward/backward) contact position and another parameter pair with (left/right and forward/backward) twisting/rocking. In this latter example there is available potential added structure in the metaphor by viewing the twisting/rocking plane as being superimposed over the position plane. The superposition aspect of the metaphor can be viewed as an index, or as an input-plane/output-plane distinction for a two-input/two-output transformation, or as two separated processes which may be caused to converge or morph according to additional overall pressure, or in conjunction with a dihedral angle of intersection between two independent processes, etc.

Next, examples of the rich syntactical aspects of interacting with the pressure-sensor array touch-pad are illustrated. Some instruments have particular hand postures naturally associated with their playing. It is natural then to recognize these classical hand-contact postures and derive control parameters that match and/or transcend how a classical player would use these hand positions to evoke and control sound from the instrument. Further, some postures could be recognized either in isolation or in gestural-context as being ones associated with (or assigned to) percussion effects while remaining postures may be associated with accompanying melodies or sound textures.

As an additional syntactic aspect, specific hand postures and/or gestures may be mapped to specific selected assignments of control signals in ways affiliated with specific purposes. For example, finger ends may be used for one collection of sound synthesis parameters, thumb for a second potentially partially overlapping collection of sound synthesis parameters, flat fingers for a third partially-overlapping collection, wrist for a fourth, and cuff for a fifth, and first for a sixth. In this case it may be natural to move the hand through certain connected sequences of motions; for example: little finger end, still in contact, dropping to flat-finger contact, then dropping to either palm directly or first to cuff and then to palm, then moving to wrist, all never breaking contact with the touch-pad. Such permissible sequences of postures that can be executed sequentially without breaking contact with the touch-pad will be termed "continuous grammars."

Under these circumstances it is useful to set up parameter assignments, and potentially associated context-sensitive parameter renormalizations, that work in the context of selected (or all available) continuous grammars. For example, as the hand contact evolves as being recognized as one posture and then another, parameters may be smoothly handed-over in interpretation from one posture to another without abrupt changes, while abandoned parameters either hold their last value or return to a default value (instantly or via a controlled envelope).

Now a number of example applications of the pressure-sensor array touchpad are provided. It is known to be possible and valuable to use the aforementioned pressure-sensor array touch-pad, implicitly containing its associated data acquisition, processing, and assignment elements, for many, many applications such as general machine control and computer workstation control. One example of machine control is in robotics: here a finger might be used to control a hazardous material robot hand as follows:
 left/right position: left/right hand position
 in/out position: in/out hand position
 in/out rock: up/down hand position
 rotation: hand grip approach angle
 overall pressure: grip strength
 left/right twist: gesture to lock or release current grip from pressure control A computer workstation example may involve a graphical Computer-Aided Design application currently requiring intensive mouse manipulation of parameters one or two at a time:
 left/right position: left/right position of a selected symbol in a 2-D CAD drawing
 in/out position: up/down position of a selected symbol in 2-D CAD drawing
 left/right twist: symbol selection—left/right motion through 2-D palette
 in/out rock: symbol selection—up/down motion through 2-D palette
 rotation: rotation of selected symbol in the drawing
 overall pressure: sizing by steps
 tap of additional finger: lock selection into drawing or unlock for changes
 tap of thumb: undo
 palm: toggle between add new object and select existing object Clearly a symbol can be richly interactively selected and installed or edited in moments as opposed to tens to hundreds of seconds as is required by mouse manipulation of parameters one or two at a time and the necessary mode-changes needed to change the mouse action interpretation.

Touch-Pad Array

Touch-pad instrument elements, such as null/contact types and pressure-sensor array types described earlier, can be used in isolation or arrays to create electronic controller instruments. The touch-pad(s) may be advantageously supplemented with panel controls such as push buttons, sliders, knobs as well as impact sensors for velocity-controlled triggering of percussion or pitched note events. If one or more of the touch-pads is transparent (as in the case of a null/contact touch screen overlay) one or more video, graphics, or alpha-numeric displays 2711 may placed under a given pad or group of pads.

Figure 6:
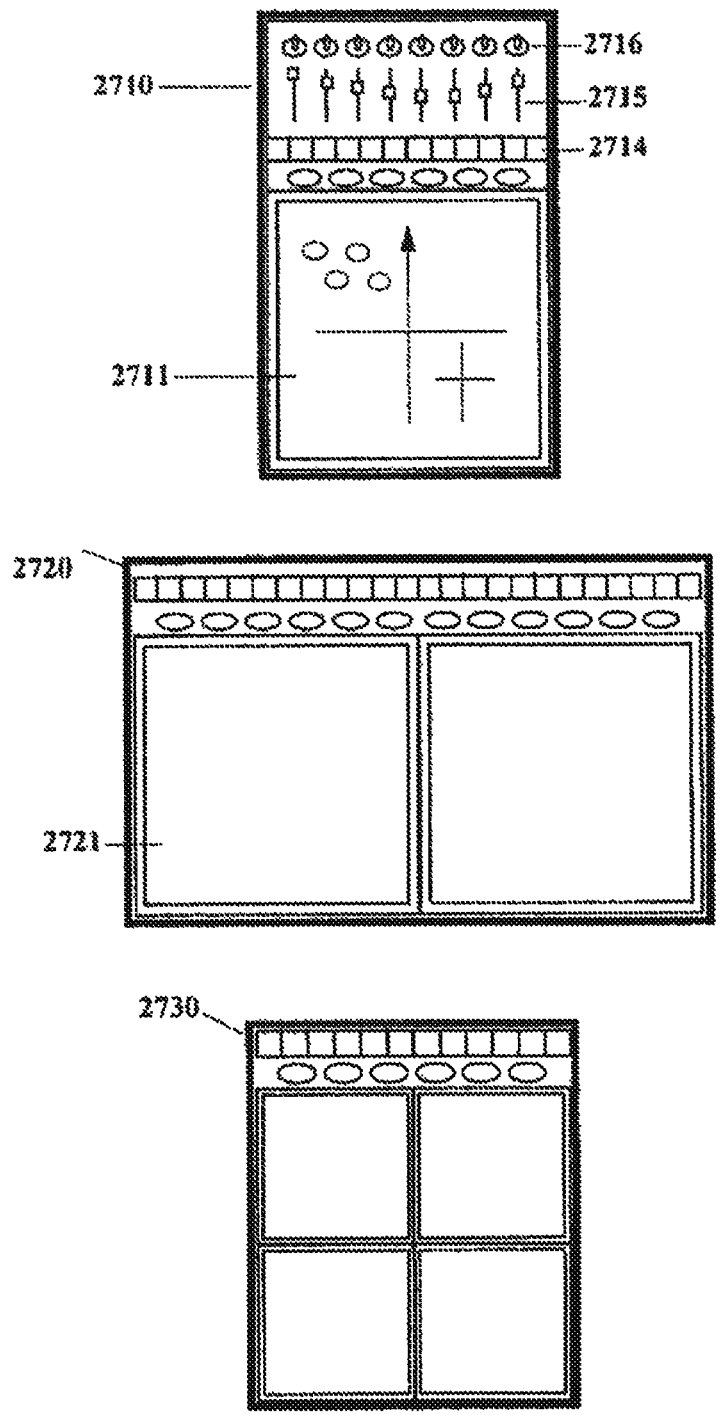
FIG. 6 illustrates examples of single, double, and quadruple touch-pad instruments with pads of various sizes and supplemental instrument elements.

FIG. 6 illustrates examples of single 2710, double 2720, and quadruple 2730 touchpad instruments with pads of various sizes. A single touch-pad could serve as the central element of such an instrument, potentially supplemented with panel controls such as push buttons 2714, sliders 2715, knobs 2716 as well as impact sensors. In FIG. 6, a transparent pad superimposed over a video, graphics, or one or more alpha-numeric displays is assumed, and specifically shown is a case of underlay graphics cues being displayed for the player. Two large sensors can be put side by side to serves as a general purpose left-hand/right-hand multi-parameter controller.

All publications and patent applications mentioned in this specification are herein incorporated by reference to the same extent as if each individual publication or patent application was specifically and individually indicated to be incorporated by reference. The invention now being fully described, it will be apparent to one of ordinary skill in the art that many changes and modifications can be made thereto without departing from its spirit or scope.

REFERENCES CITED

The following references are cited in this patent application using the format of the first one or two authors last name(s) within square brackets"[ ]", multiple references within a pair of square brackets separated by semicolons ";"

[Ronse] Ronse, Christian and Devijver, Pierre A., *Connected Components in Binary Images: the Detection Problem*, John Wiley & Sons Inc. New York, 1984;

[Viberg] Viberg, Mats, *Subspace Fitting Concepts in Sensor Array Processing*, Linkoping Studies in Science and Technology. Dissertations No. 27 Linkoping, Sweden 1989;

[Shapiro] Shapiro, Larry S, *Affine Analysis of Image Sequences*, Cambridge University Press, 1995;

[Hara] Hara, Yoshiko "Matsushita demos multilayer MPEG-4 compression", Electronic Engineering Times, Apr. 19, 1999.

What is claimed is:

1. An apparatus comprising:
 a touch screen having a contiguous region sensing contact from at least a portion of a human hand on a surface of the touch screen, the touch screen comprising a visual display and a sensor array having a plurality of sensors, each sensor having a unique spatial location and an associated unique address, the sensing comprising generation of sensor measurement values associated with each of the plurality of sensors;

wherein sensors at a plurality of sensor spatial locations are configured to provide associated sensor measurement values responsive to the sensed contiguous region of contact;

a value of at least one control parameter for the contiguous region of contact responsive to a measured change in at least one of the associated sensor measurement values, the value obtained by performing a calculation based on the associated sensor measurement values and interpreting the results as signifying a touch gesture, wherein the at least one control parameter is associated with the touch gesture; and at least one of the control parameters is assigned to a specific control signal;

wherein the touch gesture comprises a finger flick touch gesture recognized from sequential dynamics among postures.

2. The apparatus of claim 1, wherein sensor measurement values responsive to the sensed contiguous region of contact exceed a threshold.

3. The apparatus of claim 1, wherein the touch screen further tracks a trajectory of movement of the portion of the human hand contacting the surface of the transparent touch screen.

4. The apparatus of claim 1, wherein the at least one control parameter is responsive to a geometric center of the contiguous region of contact.

5. The apparatus of claim 1, wherein the at least one control parameter is responsive to a total size of the contiguous region of contact.

6. The apparatus of claim 1, wherein the touch screen further senses at least a second contiguous region of contact from another portion of the human hand on the touch screen, and the apparatus further derives a value of at least another control parameter responsive to the second contiguous region of contact.

7. The apparatus of claim 1, wherein the at least one control parameter assigned to the specific control signal comprises a particular control parameter.

8. The apparatus of claim 7, wherein the particular control parameter is assigned to the specific control signal using stored control signal assignment information.

9. The apparatus of claim 8, wherein a plurality of different assignments is stored for the particular control parameter.

10. The apparatus of claim 9, wherein the particular control parameter is dynamically assigned to the specific control signal for a specific purpose in a programmable manner under selectable stored program control.

11. The apparatus of claim 7, wherein the particular control parameter is dynamically assigned to the specific control signal in a programmable manner.

12. An apparatus comprising:

a touch screen having a contiguous region sensing contact from at least a portion of a human hand on a surface of the touch screen, the touch screen comprising a display and a sensor array comprising a plurality of sensors, each of the plurality of sensors configured with a unique spatial location and an associated unique address, each of the plurality of sensors configured to generate sensor measurement values;

wherein sensors at a plurality of sensor spatial locations are configured to provide associated sensor measurement values responsive to the contiguous region of contact;

a value of at least one control parameter for the contiguous region of contact responsive to a measured change in at least one of the associated sensor measurement values, the value obtained by performing a calculation based on the associated sensor measurement values and interpreting the results as signifying a touch gesture, wherein the at least one control parameter is associated with the touch gesture; and at least one of the control parameters is assigned to a specific control signal;

wherein the touch gesture is recognized from sequential dynamics among hand contact patterns from a first posture associated with a first portion of a user hand at a first location on the touch screen to a second posture associated with a second portion of the user hand at a second location on the touch screen, wherein the first portion of the user hand and the second portion of the user hand are different.

13. The apparatus of claim 12, wherein the associated sensor measurement values responsive to the contiguous region of contact exceed a threshold.

14. The apparatus of claim 12, wherein the apparatus is further configured to track a trajectory of movement of the portion of the human hand contacting the surface of the touch screen.

15. The apparatus of claim 12, wherein the at least one control parameter is responsive to a geometric center of the contiguous region of contact.

16. The apparatus of claim 12, wherein the at least one control parameter is responsive to a total size of the contiguous region of contact.

17. The apparatus of claim 12, wherein the touch screen is further configured to sense at least a second contiguous region of contact from another portion of a human hand on a surface of the touch screen, and the apparatus is configured to derive a value of at least another control parameter responsive to the second contiguous region of contact.

18. The apparatus of claim 12, wherein the touch gesture comprises a plurality of finger postures executed sequentially without breaking contact with the touch screen.

19. The apparatus of claim 12, wherein the touch gesture employs a continuous grammar.

20. The apparatus of claim 12, wherein the apparatus is configured to respond to a velocity of touch gestures.

21. The apparatus of claim 12, wherein the at least one control parameter assigned to the specific control signal comprises a particular control parameter.

22. The apparatus of claim 21, wherein the particular control parameter is assigned to the specific control signal using stored control signal assignment information.

23. The apparatus of claim 22, wherein a plurality of different assignments is stored for the particular control parameter.

24. The apparatus of claim 23, wherein the particular control parameter is dynamically assigned to the specific control signal for a specific purpose in a programmable manner under selectable stored program control.

25. The apparatus of claim 21, wherein the particular control parameter is dynamically assigned to the specific control signal in a programmable manner.

* * * * *